3,347,940
CHLORINATED AROMATIC FREE RADICALS
AND THEIR PREPARATION
Manuel Ballester and Juan Riera, Barcelona, Spain, assignors, by mesne assignments, to E. I. du Pont de Nemours and Company, Wilmington, Del., a corporation of Delaware
No Drawing. Filed Oct. 8, 1965, Ser. No. 494,245
5 Claims. (Cl. 260—649)

This invention relates to highly halogenated aromatic substances and a process for their preparation. More particularly it relates to perchlorinated diarylmethyl free radical compositions and their preparation.

Although organic carbon free radicals are known, they are either reactive toward oxygen, halogens, and/or nitric oxide or exist only in a particular solvent. Thus, it is an object of this invention to provide stable organic carbon free radicals in the solid state. It is another object to provide a process for preparing such free radicals. These and other objects will become apparent hereinafter.

The objects of this invention are accomplished by providing perchlorinated diarylmethyl free radicals represented by the formula

or, as it is sometimes written

wherein C represents a neutral trivalent carbon atom; Ar and Ar' each represent perchlorophenyl or perchlorobiphenylyl. Preferably the Ar and Ar' groups are perchlorophenyl.

The novel free radicals of this invention are prepared by reacting a compound of the formula

wherein Ar and Ar' are defined as above, with a dechlorinating agent in a diluent medium and in an inert atmosphere.

The dechlorinating agent is preferably a metallic chloride, such as ferrous chloride or stannous chloride (anhydrous or solvated) and is employed in a minimum proportion of one equivalent for each mole of the perchlorodiarylmethane reactant.

The diluent or solvent medium can be an ether, as for example, ethyl ether, tetrahydrofuran, dioxane and the like, or other solvents, as for example, chloroform with addition of a high dielectric constant substance such as dimethyl sulfoxide.

The mixture is refluxed in an inert atmosphere such as nitrogen for from 2–90 hours. After the reaction is completed the product is purified by conventional methods to obtain the solid free radical. For example, the reaction mixture can be cooled, acidified, and the solvent layer separated. Upon washing, drying and evaporating the solvent, the solid product is obtained. It can be purified by dissolving in a hydrocarbon solvent such as hexane, passing through chromatographic alumina, and evaporating the solvent.

The free radicals so obtained are paramagnetic substances which under ordinary conditions show an exceptional degree of chemical inertness toward oxygen, chlorine, bromine, iodine, nitric oxide and solvents. For example, perchlorodiphenylmethyl can be exposed to air at ambient temperatures for at least eighteen months without appreciable change.

The following examples illustrate the products and process of this invention.

Example 1

A mixture of 4.01 parts by weight of perchlorodiphenylmethane,

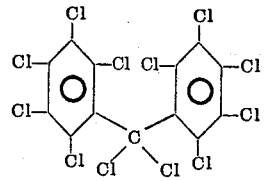

6.66 parts by weight of anhydrous stannous chloride, and 570 parts by weight of ethyl ether was refluxed for four hours in an inert atmosphere. The resulting mixture, after it had cooled, was poured into water made acidic with hydrochloric acid (to avoid the hydrolysis of the tin salt) and was agitated vigorously. The ethereal layer was separated, washed with water, and dried to obtain, after elimination of the solvent, a residue of 3.84 parts by weight. The residue was dissolved in 530 parts by weight of hexane and the solution passed through chromatographic alumina. After elimination of the solvent, 1.94 parts by weight of the perchlorodiphenylmethyl radical

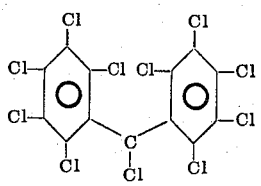

were obtained. This represents a molar efficiency of 48% based on the initial quantity of perchlorodiphenylmethane. The product is a paramagnetic crystalline solid, of red-orange color, which melts with decomposition at about 185° C.

Analysis.—Calculated for $C_{13}C_{11}$: C, 28.6%; Cl, 71.4%; Molecular Wt., 546. Found: C, 28.8%; Cl, 71.4%; Molecular Wt., 563.

Infrared spectrum.—Frequencies of the absorption peaks in cm.$^{-1}$: 1504 (weak), 1342 (weak), 1325 (strong), 1307 (medium), 1295 (strong), 1250 (strong), 1124 (weak), 995 (medium), 794 (medium), 695 (medium).

Ultraviolet and visible spectrum.—Wave lengths of absorption peaks in m$\mu$: 225, 299, 367 (shoulder), 382. Corresponding molar extinctions: 51,200, 4,350, 11,200, 15,300.

Electron paramagnetic resonance spectrum.—In chloroform: g factor=2.0057; hyperfine structure: four lines of low resolution corresponding to a hyperfine splitting of 2.5±0.1 gauss. In solid state—number of spins per mole: $3.1 \times 10^{23}$ (experimental error 50%).

Example 2

A mixture of 10 parts by weight of perchlorodiphenylmethane, 22 parts by weight of anhydrous ferrous chloride, and 5300 parts by weight of ethyl ether was refluxed for 24 hours in an inert atmosphere. The resulting mixture, after it had cooled, was poured over water made acid with hydrochloric acid, and was agitated vigorously. The ether layer was separated, washed with water, and dried, obtaining, after elimination of the solvent, a residue which was washed with hexane and dried to give 9.0 parts by weight of the perchlorodiphenylmethyl radical. This represents an efficiency of 95% based on the initial quantity of perchlorodiphenylmethane.

Example 3

A mixture of 202 parts by weight of perchlorodiphenylmethane, 426 parts by weight of anhydrous ferrous chloride, 4250 parts by weight of chloroform, and 440 parts by weight of dimethyl sulfoxide was agitated for 90 hours at room temperature in an inert atmosphere. The resulting mixture was poured over water made acid with hydrochloric acid and agitated vigorously. The chloroform layer was separated, washed several times with water to eliminate the dimethyl sulfoxide, and dried, to obtain, after elimination of the solvent, a residue which was dissolved in hexane and passed through chromatographic silica gel. After elimination of the solvent, 161 parts by weight of the perchlorodiphenylmethyl radical was obtained which represents a molar efficiency of 85% based on the initial quantity of perchlorodiphenylmethane.

By employing such reactants as perchloro-4-phenyldiphenylmethane and perchloro-4,4'-diphenyldiphenylmethane, the Ar and Ar' groups can be varied to obtain a variety of products. Thus, the products of the invention are exemplified by perchlorodiphenylmethyl, perchloro-4-phenyldiphenylmethyl, perchloro-4,4'-diphenyldiphenylmethyl, and the like.

The methane reactants employed in the process of this invention can be prepared by chlorinating the parent diaryl-α-α-dichloromethanes. For example, perchlorodiphenylmethane is prepared by reaction of the chlorinating agent (a mixture of sulfuryl chloride, sulfur monochloride, and anhydrous aluminum chloride), described by Ballester et al., J. Am. Chem. Soc., 82, 4254 (1960), with α,α-dichlorodiphenylmethane. Its properties are described in publication ARL 64–141, Office of Aerospace Research, U.S. Air Force (September 1964).

The chemical inertness of the products of this invention and their unusual stability make them useful as standards for the measurement of electron paramagnetic resonance, semiconducting materials, magnetic materials, and chemical stabilizers.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A composition of the formula

wherein:
C represents a neutral trivalent carbon atom;
Ar and Ar' each represent perchlorophenyl or perchlorobiphenylyl.

2. The composition of claim 1 wherein Ar and Ar' are perchlorophenyl groups and R is chlorine.

3. The process for preparing compositions of the formula

wherein:
C represents a neutral trivalent carbon atom;
Ar and Ar' each represent perchlorophenyl or perchlorobiphenylyl which comprises reacting in an inert atmosphere a compound of the formula

wherein Ar and Ar' are defined as above, with stannous chloride or ferrous chloride present in a minimum proportion of one equivalent for each mole of the above compound, in a diluent medium selected from the group consisting of ethyl ether, tetrahydrofuran, dioxane and mixtures of chloroform with dimethyl sulfoxide.

4. The process of claim 3 wherein Ar and Ar' are perchlorophenyl.

5. The process of claim 4 wherein the diluent medium is an ether selected from the group consisting of ethyl ether, tetrahydrofuran and dioxane.

References Cited

Ballester et al., J. Am. Chem. Soc. 86, p. 4505 (1964).
Fieser, Advanced Organic Chemistry, New York, Reinhold, 1961, p. 349.

LEON ZITVER, *Primary Examiner.*

N. KING, Jr., H. MARS, *Assistant Examiners.*

PO-1050
(5/69)

UNITED STATES PATENT OFFICE
CERTIFICATE OF CORRECTION

Patent No. 3,347,940          Dated    October 17, 1967

Inventor(s)   Manuel Ballester and Juan Riera

It is certified that error appears in the above-identified patent and that said Letters Patent are hereby corrected as shown below:

Col. 4, Claim 2, line 2, "group and R is chlorine" should be deleted; and

Col. 4, Claim 3, each "R" in the formula should be replaced by -- Cl --;

Signed and sealed this 27th day of June 1972.

(SEAL)
Attest:

EDWARD M. FLETCHER, JR.            ROBERT GOTTSCHALK
Attesting Officer                  Commissioner of Patents